US012663387B2

(12) United States Patent
Abbosh et al.

(10) Patent No.: US 12,663,387 B2
(45) Date of Patent: Jun. 23, 2026

(54) ELECTROMAGNETIC IMAGING CALIBRATION METHOD

(71) Applicant: EMvision Medical Devices Ltd, Brisbane (AU)

(72) Inventors: Amin Abbosh, Brisbane (AU); Konstanty Bialkowski, Brisbane (AU)

(73) Assignee: EMvision Medical Devices Ltd, Brisbane (AU)

( * ) Notice: Subject to any disclaimer, the term of this patent is extended or adjusted under 35 U.S.C. 154(b) by 78 days.

(21) Appl. No.: 18/722,413

(22) PCT Filed: Dec. 22, 2022

(86) PCT No.: PCT/AU2022/051567
§ 371 (c)(1),
(2) Date: Jun. 20, 2024

(87) PCT Pub. No.: WO2023/115141
PCT Pub. Date: Jun. 29, 2023

(65) Prior Publication Data
US 2024/0402099 A1     Dec. 5, 2024

(30) Foreign Application Priority Data

Dec. 22, 2021     (AU) ................................. 2021904208

(51) Int. Cl.
*G01N 23/046*          (2018.01)
(52) U.S. Cl.
CPC ..... *G01N 23/046* (2013.01); *G01N 2223/302* (2013.01); *G01N 2223/303* (2013.01);
(Continued)
(58) Field of Classification Search
CPC .......... G01N 23/046; G01N 2223/302; G01N 2223/303
See application file for complete search history.

(56) References Cited

U.S. PATENT DOCUMENTS 9,194,930 B2     11/2015  Pupalaikis
2008/0125999 A1     5/2008  Rumiantsev et al.

FOREIGN PATENT DOCUMENTS

CN          112630716 A  *  4/2021   ............. G01R 35/00

OTHER PUBLICATIONS

Analyzer, Iefn. "Two-port network analyzer calibration using an unknown "thru"." IEEE Microwave and guided wave letters 2 (1992): 505. (Year: 1992).*

(Continued)

*Primary Examiner* — Edwin C Gunberg
*Assistant Examiner* — Richard O Toohey
(74) *Attorney, Agent, or Firm* — Sterne, Kessler, Goldstein & Fox P.L.L.C.

(57)          ABSTRACT

A method of calibrating an electromagnetic medical imaging apparatus having a vector network analyser (VNA) coupled via transmission lines to an array of antennas disposed about an imaging domain; measure scattering parameters $S_{cal}$ for a known calibration object at a known location within the imaging domain; process the measured scattering parameters $S_{cal}$ to calculate calibration terms; rearranging at least some of the transmission lines in preparation for imaging a subject; with the rearranged transmission lines, measure scattering parameters for one-port calibration standards to determine matrices $Y_A$ and $Y_B$; calculate a thru error term $a_M$ for calibrating scattering parameters for the subject; with the rearranged transmission lines, measure scattering parameters of the subject and calibrate the measured scattering parameters of the subject.

$$Y_A = \begin{bmatrix} -\dfrac{\Delta_A}{t_{11}} & \dfrac{e_A^{00}}{t_{11}} \\ -\dfrac{e_A^{11}}{t_{11}} & \dfrac{1}{t_{11}} \end{bmatrix} \quad Y_B = \begin{bmatrix} \dfrac{1}{t_{22}} & -\dfrac{e_B^{11}}{t_{22}} \\ \dfrac{e_B^{00}}{t_{22}} & -\dfrac{\Delta_B}{t_{22}} \end{bmatrix};$$

where $t_{11} = e_A^{01} e_A^{10}$, $t_{22} = e_B^{01} e_B^{10}$, $$\Delta_A = (e_A^{00} e_A^{11} - e_A^{01} e_A^{10}), \text{ and } \Delta_B = (e_B^{00} e_B^{11} - e_B^{01} e_B^{10});$$

12 Claims, 6 Drawing Sheets

(52) U.S. Cl.
CPC . *G01N 2223/304* (2013.01); *G01N 2223/306*
(2013.01); *G01N 2223/612* (2013.01)

(56) References Cited

OTHER PUBLICATIONS

Ferrero et al., "Two-Port Network Analyzer Calibration Using an
Unknown 'Thru,'" IEEE Microwave and Guided Wave Letters, vol.
2, No. 12, Dec. 1992, pp. 505-507.
International Search Report for International Application No. PCT/
AU2022/051567, dated Mar. 23, 2023, 3 pgs.
Pulido-Gaytan et al., "Vector Network Analyzer Calibration Using
a Line and Two Offset Reflecting Loads," IEEE Transactions on
Microwave Theory and Techniques, v. 61, No. 9, Sep. 2013, pp.
3417-3423.

* cited by examiner

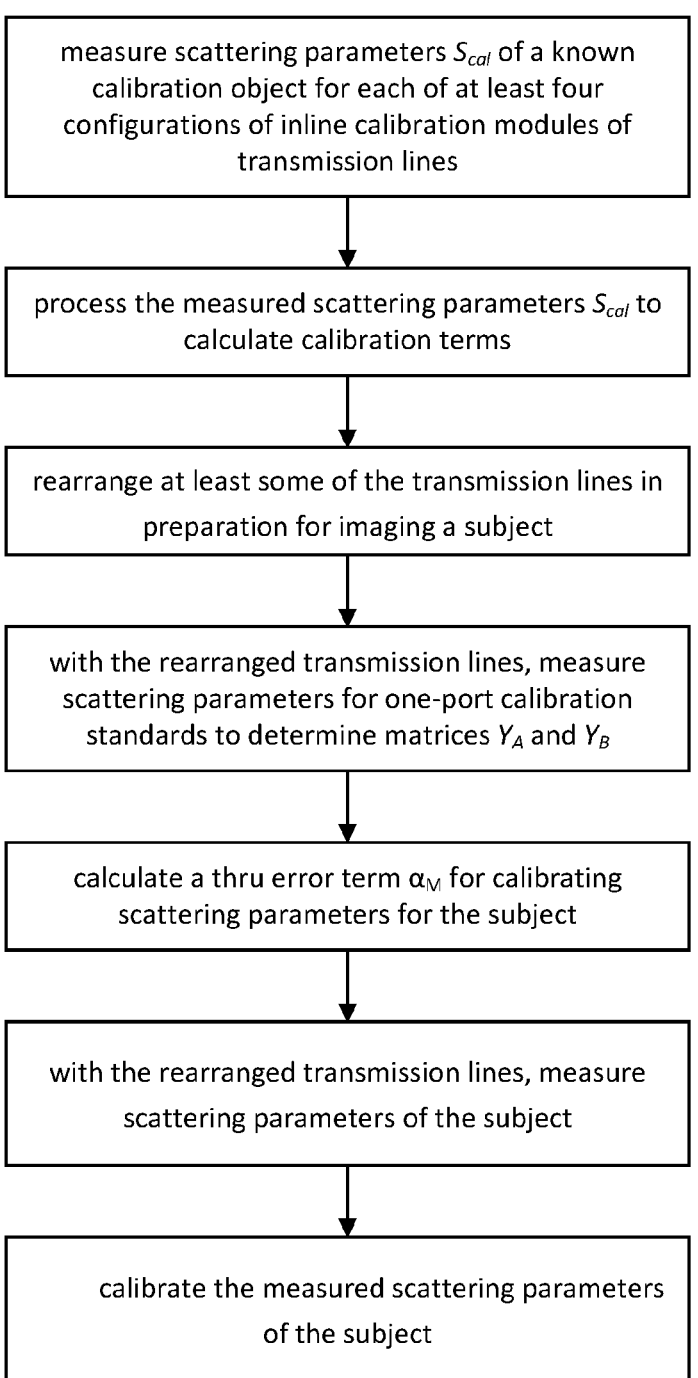

measure scattering parameters $S_{cal}$ of a known
calibration object for each of at least four
configurations of inline calibration modules of
transmission lines process the measured scattering parameters $S_{cal}$ to
calculate calibration terms rearrange at least some of the transmission lines in
preparation for imaging a subject with the rearranged transmission lines, measure
scattering parameters for one-port calibration
standards to determine matrices $Y_A$ and $Y_B$ calculate a thru error term $\alpha_M$ for calibrating
scattering parameters for the subject with the rearranged transmission lines, measure
scattering parameters of the subject calibrate the measured scattering parameters
of the subject

Figure 4

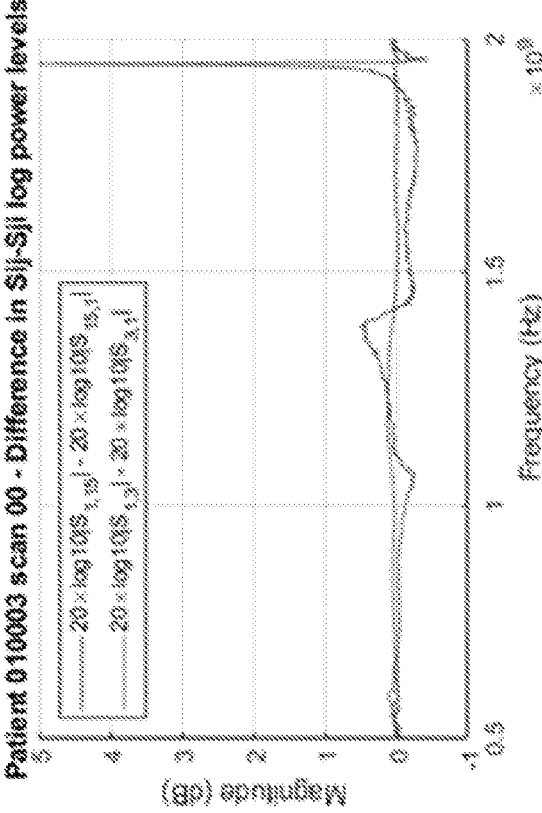
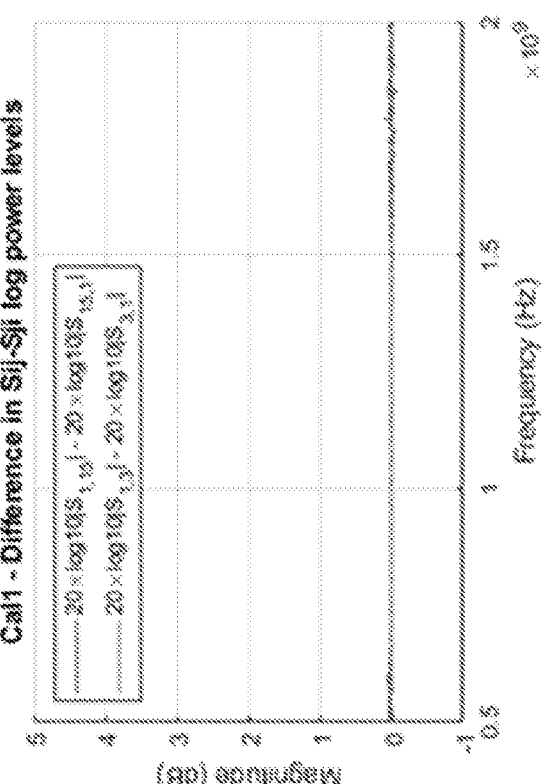
Figure 6

ELECTROMAGNETIC IMAGING CALIBRATION METHOD

CROSS-REFERENCE TO RELATED APPLICATIONS

The present application claims priority under 35 U.S.C. § 371 to International Patent Application No. PCT/AU2022/051567, filed Dec. 22, 2022, which claims priority to and the benefit of Australian Patent Application No. 2021904208, filed Dec. 22, 2021. The contents of these applications are hereby incorporated by reference in their entireties.

TECHNICAL FIELD

The present invention relates to medical imaging technology, and in particular to electromagnetic imaging, and more particularly to an electromagnetic medical imaging calibration module and method.

BACKGROUND

Electromagnetic medical imaging typically requires a multi-channel sensor array with transmitting/receiving antennas arranged around an object to be imaged. To enable the accurate and unbiased measurement of radio frequency ("RF") signals received by every antenna, it is essential to set the amplitude and phase of each sensor channel equally and precisely. However, in practice, there can be considerable amplitude and phase differences between the channels due to the different RF hardware of each sensor channel. These undesired phase shifts and amplitude attenuations are mainly caused by unintended variations in the RF properties of the antennas, the matching medium, adapters, connectors, transmission lines, coaxial cables and the like. Additionally, the phase and amplitude characteristics of most RF devices depend on frequency and temperature, and usually drift over time.

For a sensor array to perform in a precise and reliable manner as desired, the system hardware is calibrated by measuring and equalizing the phase and amplitude characteristics of all sensor channels. Since the relative phase/amplitude shifts of RF devices often depend on temperature and mechanical disturbances that usually vary over time (e.g., due to aging or temperature changes), such hardware calibration should be repeated periodically (or whenever necessary) to compensate for those variations. Indeed, such calibration is essential for any reasonable imaging results, as the changes in scattered signals due to those undesired effects may be larger than the target response, such as the stroke response in head imaging.

Portable EM Imaging systems are being developed. While this has obvious advantages, it creates significant challenges for system calibration. In particular, movements of the system and the act of placing the antenna array on the patient's head cause unavoidable movements of the interconnecting cables, giving rise to errors in the acquired data. Those errors can mask the weak target response from deep and/or small targets.

It is desired, therefore, to overcome or alleviate one or more difficulties of the prior art, or to at least provide a useful alternative.

SUMMARY

In accordance with the present invention, there is provided a method of calibrating an electromagnetic medical imaging apparatus having a vector network analyser (VNA) coupled via transmission lines to an array of antennas disposed about an imaging domain, the method including the steps of:

using the apparatus to measure scattering parameters $S_{cal}$ for a known calibration object at a known location within the imaging domain, wherein each of the antennas of the array of antennas is connected to the VNA via a corresponding transmission line and a corresponding inline calibration module disposed between the transmission line and the antenna, wherein the measurements are performed for each of at least four configurations of the inline calibration module, the at least four configurations including a measurement configuration in which the inline calibration module is configured to electrically connect the transmission line to the corresponding antenna, and at least three calibration configurations in which the inline calibration module is configured to implement respective different calibration standards;

processing the measured scattering parameters $S_{cal}$ to calculate calibration terms $e^{00}$, $e^{01}$, $e^{10}$, and $e^{11}$ for ports A and B;

rearranging at least some of the transmission lines in preparation for imaging a subject disposed within the imaging domain;

with the rearranged transmission lines, measuring scattering parameters for one-port calibration standards to determine matrices $Y_A$ and $Y_B$ for respective ports A and B, according to:

$$Y_A = \begin{bmatrix} -\dfrac{\Delta_A}{t_{11}} & \dfrac{e_A^{00}}{t_{11}} \\ -\dfrac{e_A^{11}}{t_{11}} & \dfrac{1}{t_{11}} \end{bmatrix} \quad Y_B = \begin{bmatrix} \dfrac{1}{t_{22}} & -\dfrac{e_B^{11}}{t_{22}} \\ \dfrac{e_B^{00}}{t_{22}} & -\dfrac{\Delta_B}{t_{22}} \end{bmatrix};$$

where $t_{11} = e_A^{01} e_A^{10}$, $t_{22} = e_B^{01} e_B^{10}$, $$\Delta_A = \left( e_A^{00} e_A^{11} - e_A^{01} e_A^{10} \right), \text{ and } \Delta_B = \left( e_B^{00} e_B^{11} - e_B^{01} e_B^{10} \right);$$

calculating a thru error term $\alpha_M$ for calibrating scattering parameters for the subject, according to:

$$\alpha_M = \pm \sqrt{\frac{\det T_{cal} \det Y_B}{\det Y_A}}$$

where $T_{cal}$ is the transmission matrix for the known calibration object;

with the rearranged transmission lines, measuring scattering parameters for the subject disposed within the imaging domain; and calibrating the measured scattering parameters of the subject according to:

$$T_{subject\_cal} = \alpha_M^{-1} Y_A^{-1} T_{subject} Y_B$$

where $T_{subject\_cal}$ and $T_{subject}$ are calibrated and uncalibrated transmission matrices for the subject, respectively.

In some embodiments, the at least three calibration configurations include calibration configurations in which the inline calibration module is configured to, respectively: (i)

short circuit the transmission line, (ii) open circuit the transmission line, and (iii) electrically connect the transmission line to a predetermined load.

In some embodiments, the method further includes:

using the apparatus to measure scattering parameters while the subject remains disposed within the imaging domain, and the inline calibration modules are configured to connect the first end of the transmission line to the predetermined load;

computing a difference between a resulting measurement and a corresponding previous measurement; and comparing the difference to a noise level to assess movement of the transmission lines.

In some embodiments, the method further includes repeating steps (i) to (iii) at temporally spaced intervals to monitor for movement of the transmission lines over time. In some embodiments, the method further includes pausing further measurements of scattering parameters unless the computed difference is substantially larger than the noise level.

In some embodiments, the method further includes pausing further measurements of scattering parameters unless the computed difference is substantially larger than the noise level.

The present invention also provides an electromagnetic medical imaging apparatus configured to implement any one of the above methods.

The present invention also provides a computer-readable storage medium having stored thereon executable instructions that, when executed by at least one processor of an electromagnetic medical imaging apparatus, cause the at least one processor to execute any one of the above methods.

The present invention also provides an electromagnetic medical imaging apparatus including:

an array of antennas disposed about an imaging domain;

a vector network analyser (VNA) connected to the antennas via respective transmission lines and inline calibration modules disposed between the antennas and the transmission lines;

at least one processor configured to perform the steps of:

receiving from the VNA measurements of scattering parameters $S_{cal}$ for a known calibration object at a known location within the imaging domain, wherein the measurements are performed with the transmission lines in a first arrangement and for each of at least four configurations of the inline calibration modules, the at least four configurations including a measurement configuration in which the inline calibration module is configured to electrically connect the transmission line to the corresponding antenna, and at least three calibration configurations in which the inline calibration module is configured to implement respective different calibration standards;

processing the measured scattering parameters $S_{cal}$ to calculate calibration terms $e^{00}$, $e^{01}$, $e^{10}$, and $e^{11}$ for ports A and B;

receiving from the VNA measurements of scattering parameters for one-port calibration standards, wherein the measurements are performed with at least some of the transmission lines in a second arrangement different to the first arrangement in preparation for imaging a subject disposed within the imaging domain;

processing the scattering parameters for the one-port calibration standards to determine matrices $Y_A$ and $Y_B$ for respective ports A and B, according to:

$$
Y_A = \begin{bmatrix} -\dfrac{\Delta_A}{t_{11}} & \dfrac{e_A^{00}}{t_{11}} \\[2mm] -\dfrac{e_A^{11}}{t_{11}} & \dfrac{1}{t_{11}} \end{bmatrix} \quad Y_B = \begin{bmatrix} \dfrac{1}{t_{22}} & -\dfrac{e_B^{11}}{t_{22}} \\[2mm] \dfrac{e_B^{00}}{t_{22}} & -\dfrac{\Delta_B}{t_{22}} \end{bmatrix};
$$

where $t_{11} = e_A^{01} e_A^{10}$, $t_{22} = e_B^{01} e_B^{10}$, $$
\Delta_A = \left(e_A^{00} e_A^{11} - e_A^{01} e_A^{10}\right), \text{ and } \Delta_B = \left(e_B^{00} e_B^{11} - e_B^{01} e_B^{10}\right);
$$

calculating a thru error term $\alpha_M$ for calibrating scattering parameters for the subject, according to:

$$
\alpha_M = \pm \sqrt{\dfrac{\det T_{cal} \det Y_B}{\det Y_A}}
$$

where $T_{cal}$ is the transmission matrix for the known calibration object;

with the rearranged transmission lines, measuring scattering parameters for the subject disposed within the imaging domain; and calibrating the measured scattering parameters of the subject according to:

$$
T_{subject\_cal} = \alpha_M^{-1} Y_A^{-1} T_{subject} Y_B
$$

where $T_{subject\_cal}$ and $T_{subject}$ are calibrated and uncalibrated transmission matrices for the subject, respectively.

In some embodiments, the at least three calibration configurations include calibration configurations in which the inline calibration module is configured to, respectively: (i) short circuit the transmission line, (ii) open circuit the transmission line, and (iii) connect the transmission line to a predetermined load.

In some embodiments, the at least one processor is further configured to perform the steps of:

(i) using the apparatus to measure scattering parameters while the subject remains disposed within the imaging domain, and the inline calibration modules are configured to connect the transmission line to the predetermined load;

(ii) computing a difference between a resulting measurement and a corresponding previous measurement; and (iii) comparing the difference to a noise level to assess movement of the transmission lines.

In some embodiments, the at least one processor is further configured to repeat steps (i) to (iii) at temporally spaced intervals to monitor for movement of the transmission lines over time.

In some embodiments, the at least one processor is further configured to pause further measurements of scattering parameters unless the computed difference is substantially larger than the noise level.

Also described herein is a method of calibrating an electromagnetic medical imaging apparatus having a vector network analyser (VNA) coupled via transmission lines to an array of antennas disposed about an imaging domain, the method including the steps of:

using the apparatus to measure scattering parameters $S_{cal}$ of a known calibration object at a known location within the imaging domain, wherein each of the transmission lines includes a corresponding inline calibration module having a first port connected to a first end of a corresponding transmission line whose other end is connected to the VNA, and a second port connected to a corresponding antenna of the array of antennas, wherein the measurements are performed for each of at least four configurations of the inline calibration module, the at least four configurations including a measurement configuration in which the inline calibration module is configured to connect the first end of the transmission line to the corresponding antenna, and at least three calibration configurations in which the inline calibration module is configured to implement respective different calibration standards;

processing the measured scattering parameters $S_{fp^l}$ to calculate calibration terms $e^{00}$, $e^{01}$, $e^{10}$, and $e^{ff^l}$ for respective ports A and B;

rearranging at least some of the transmission lines in preparation for imaging a subject disposed within the imaging domain;

with the rearranged transmission lines, measuring scattering parameters for one-port calibration standards to determine matrices $Y_A$ and $Y_B$ for respective ports A and B, according to:

$$Y_A = \begin{bmatrix} -\dfrac{\Delta_A}{t_{11}} & \dfrac{e_A^{00}}{t_{11}} \\ -\dfrac{e_A^{11}}{t_{11}} & \dfrac{1}{t_{11}} \end{bmatrix} \quad Y_B = \begin{bmatrix} \dfrac{1}{t_{22}} & -\dfrac{e_B^{11}}{t_{22}} \\ \dfrac{e_B^{00}}{t_{22}} & \dfrac{\Delta_B}{t_{22}} \end{bmatrix};$$

where $t_{11} = e_A^{01} e_A^{10}$, $t_{22} = e_B^{01} e_B^{10}$, $$\Delta_A = \left(e_A^{00} e_A^{11} - e_A^{01} e_A^{10}\right), \text{ and } \Delta_B = \left(e_B^{00} e_B^{11} - e_B^{01} e_B^{10}\right);$$

calculating a thru error term $\alpha_M$ for calibrating scattering parameters for the subject, according to:

$$\alpha_M = \pm \sqrt{\frac{\det T_{cal} \det Y_B}{\det Y_A}}$$

where $T_{cal}$ is the transmission matrix for the known calibration object;

with the rearranged transmission lines, measuring scattering parameters of the subject disposed within the imaging domain; and calibrating the measured scattering parameters of the subject according to:

$$T_{subject\_cal} = \alpha_M^{-1} Y_A^{-1} T_{subject} Y_B$$

where $T_{subject\_cal}$ and $T_{subject}$ are calibrated and uncalibrated transmission matrices for the subject, respectively.

The at least three calibration configurations may include calibration configurations in which the inline calibration module is configured to, respectively: (i) short circuit the first end of the transmission line, (ii) open circuit the first end of the transmission line, and (iii) connect the first end of the transmission line to a predetermined load.

BRIEF DESCRIPTION OF THE DRAWINGS

Some embodiments of the present invention are hereinafter described, by way of example only, with reference to the accompanying drawings, wherein:

FIG. 4 is a flow diagram of an electromagnetic imaging calibration method in accordance with an embodiment of the present invention;

FIG. 6 includes graphs of differences in power levels as a function of frequency for (left-hand graph) a fixed calibration object, and (right-hand graph) a patient that has moved during a scan.

DETAILED DESCRIPTION

Electromagnetic ("EM") imaging is typically performed by introducing an object to be imaged (e.g., a patient's head) into an imaging domain surrounded by an inwardly directed array of antennas. The antennas are sequentially energised to generate electromagnetic (e.g., microwave) signals that are scattered by, transmitted through, and reflected from the object, and are received by the other antennas of the array to collect meaningful spatial information representing the spatial distribution of features within the object. The information collected thus includes measurements of the reflected signals for each individual antenna, and signals transmitted between each pair of antennas. These measurements are performed over a frequency range by sequentially transmitting a sweep of frequencies on each antenna, and receiving the resulting signals at the other antennas, in addition to measuring (by the transmitting antenna) the reflection measurement. A device known in the art as a "vector network analyser" (or "VNA") generates the measurement data from the array by storing the ratio of the transmitted and received antenna voltages at each of its ports and as a function of frequency. The resulting data is referred to in the art as "scattering parameters" (or "S parameters").

Figure 1:
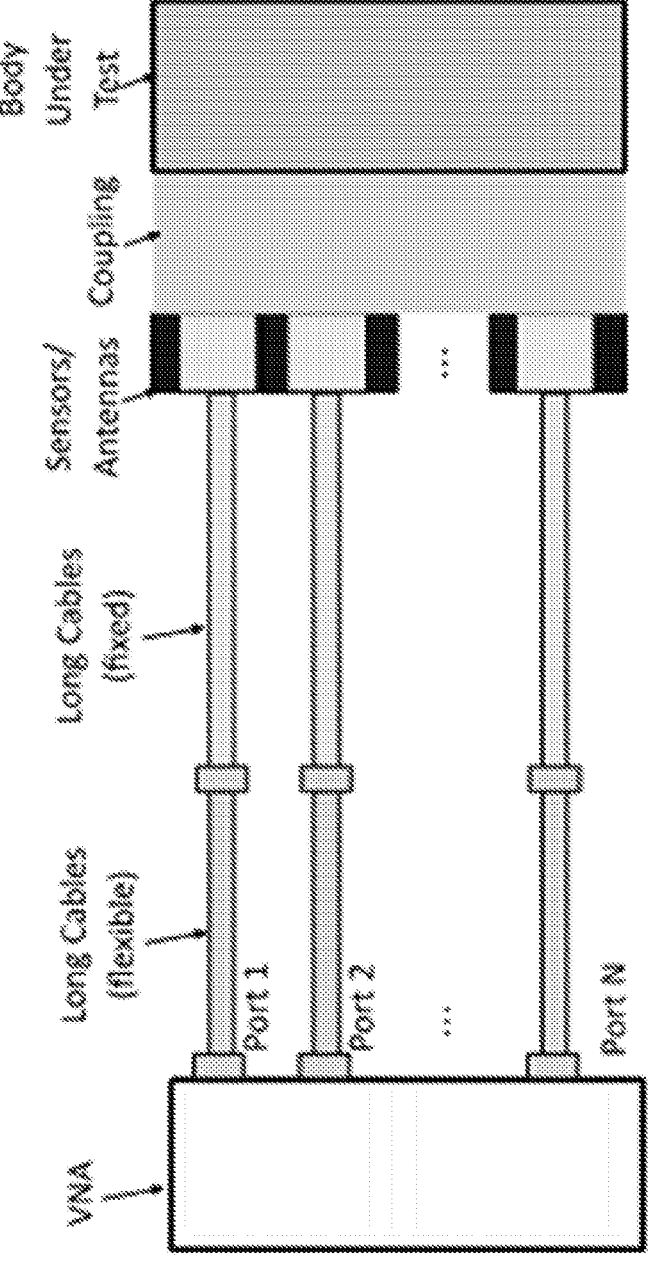
FIG. 1 is a block diagram of a prior art electromagnetic imaging apparatus.

FIG. 1 is a high-level schematic block diagram showing typical data acquisition components of prior art EM imaging systems, but including in-line calibration devices in accordance with an embodiment of the present invention. In general, there may be multiple sets of flexible and/or fixed RF transmission lines (typically, but not necessarily, in the form of coaxial cables) and connectors utilised to attach the antennas to respective ports (port 1 . . . port N) of the VNA. While in some systems the antennas are separated by a thin layer of air, in others one or more materials are used as coupling media to enhance signal penetration into the imaged object. These two regions beyond the antennas (i.e., respectively containing the coupling medium/media and the body under test) are assumed to be part of the imaging domain. The VNA is usually connected to the antennas via coaxial cables. In the described embodiment, the antennas are encased within a rigid volume, which ensures that they do not move relative to one another, and that any stray signal that might otherwise leak out is absorbed. To allow optimum fitting of the antennas to the body under test, the volume between the antennas and the body is filled with liquid to avoid large gaps.

EM imaging systems suffer from the following calibration uncertainties and unknowns:

(i) VNA internals: uncertainties along the EM signal paths, including switching elements, inter-channel leakage, and impedance mismatches;

(ii) transmission lines/coaxial cables: impedance mismatches and phase length variations caused by manufacturing tolerances/imperfections;

(iii) Connectors: impedance mismatches due to variations in torqueing and manufacturing tolerances/imperfections;

(iv) Antennas: changes in sensitivity over the frequency band due to manufacturing tolerances and/or imperfections of individual antennas; and (v) Antenna array configuration: initial variations in structure and antenna positions due to manufacturing tolerances.

These issues fall into the following two classes:

(i) Initial inconsistences: evident when comparing a specific prototype of the system with respect to other prototypes. These inconsistences may be caused by manufacturing tolerances/imperfections, and can be compensated for after manufacture.

(ii) Time stability: evident when comparing the same system at different times, and can be caused by movements and/or temperature variations. These need to be compensated for at regular intervals, and in particular prior to patient measurements.

Standard VNA Calibration

Figure 2:
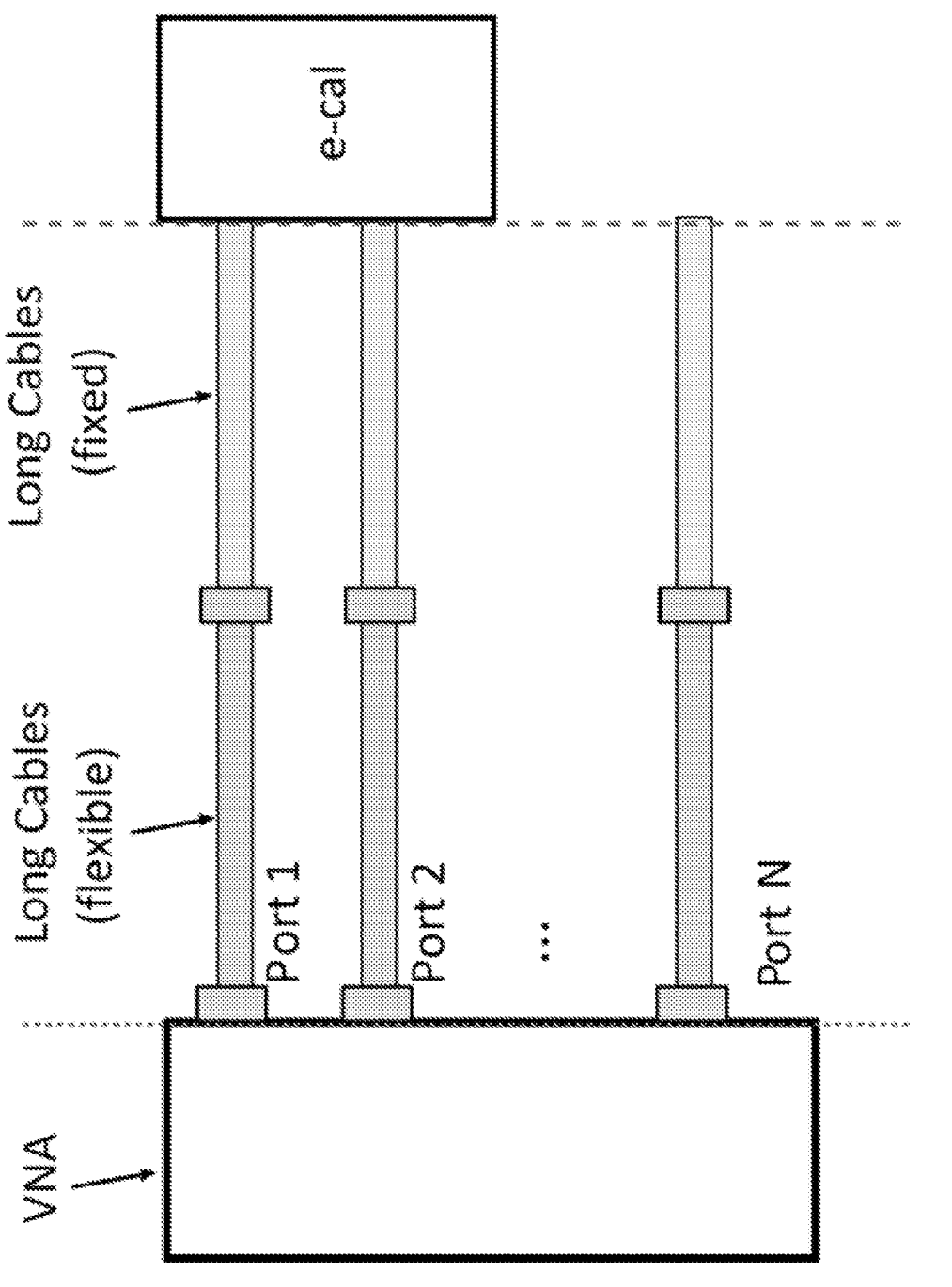
FIG. 2 is a block diagram illustrating VNA multi-port calibration of a prior art electromagnetic imaging apparatus.

VNA manufacturers recommend a standard multi-port calibration to determine a corresponding correction factor for each pair of network ports, including the VNA itself and the corresponding connected cables. As shown in FIG. 2, at a minimum each pair of ports must be connected in pairs to a reference port to determine the error terms for each port combination. VNA manufacturer calibration is often implemented using detailed error models which consider signal leakage as well as internal switching between receiver paths within the VNA itself. The result of this calibration is that the reference plane is effectively moved to the ends of the cables furthest from the VNA, and the resulting calibrations can be stored and applied at later times. With respect to the uncertainties/unknowns described above, this prior art calibration process fully addresses the VNA internals uncertainties/unknowns (i), and partially addresses the cable and connector uncertainties/unknowns (ii) and (iii).

Inline Calibration

The inventors have identified that a persisting shortcoming of prior art VNA and factory calibrations is that the cables can (and typically do) move between the time of the VNA calibration and the times when measurements are performed, introducing unwanted phase changes.

Figure 3:
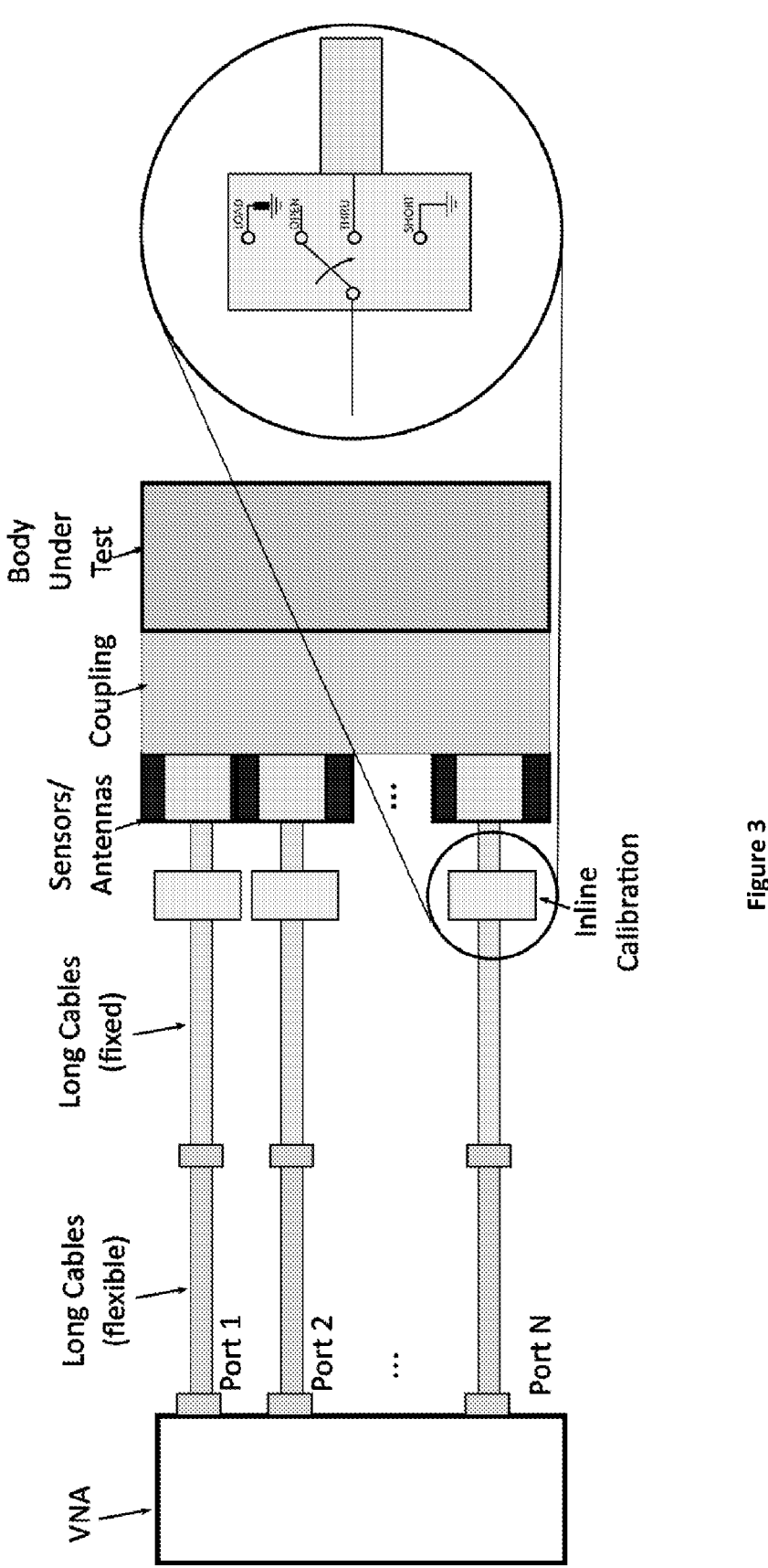
FIG. 3 is a block diagram of an electromagnetic imaging apparatus including in-line calibration components in accordance with an embodiment of the present invention.

In order to address this shortcoming, embodiments of the present invention utilise inline calibration modules, which are attached to the feeding points of the antennas as shown in FIG. 3, in a calibration process, as shown in FIG. 4. For an N-port antenna array, a total of N inline calibration modules are required. Each calibration module has 4 states, including a "thru measurement" state, an open circuit state, a short circuit state, and a predetermined or known load state. Before using the modules in an electromagnetic imaging system, a (calibrated) VNA is used to measure the electromagnetic characteristics of each module in each of its four states. The resulting S-parameter measurements are stored in a database, to be retrieved during the calibration process. The calibration process can be regarded as an enhancement of the "Unknown Thru" (or "UT") calibration method described in A. Ferrero and U. Pisani, "Two-port network analyzer calibration using an unknown 'thru'," in IEEE Microwave and Guided Wave Letters, vol. 2, no. 12, pp. 505-507, December 1992 ("Ferrero"), also known as the "Reciprocal Short Open Load" (or "RSOL") calibration method.

The Unknown Thru Method

The UT calibration method is particularly applicable in network calibrations where the electromagnetic transmission characteristics of the signal transmission components for each port of the VNA can be easily measured under open circuit, short circuit, and known load conditions, but are difficult to measure for a known "thru" (i.e., the object being imaged) without changing the measurement configuration. Applying the method to an object to be imaged (in the general sense traditionally referred to in the art as the "Device-Under-Test", hence the abbreviation "DUT") relies on:

(i) the object being reciprocal;

(ii) having approximate knowledge of the phase changes in Si of the object; and (iii) having a detectable signal on the receiving side.

Figure 5:
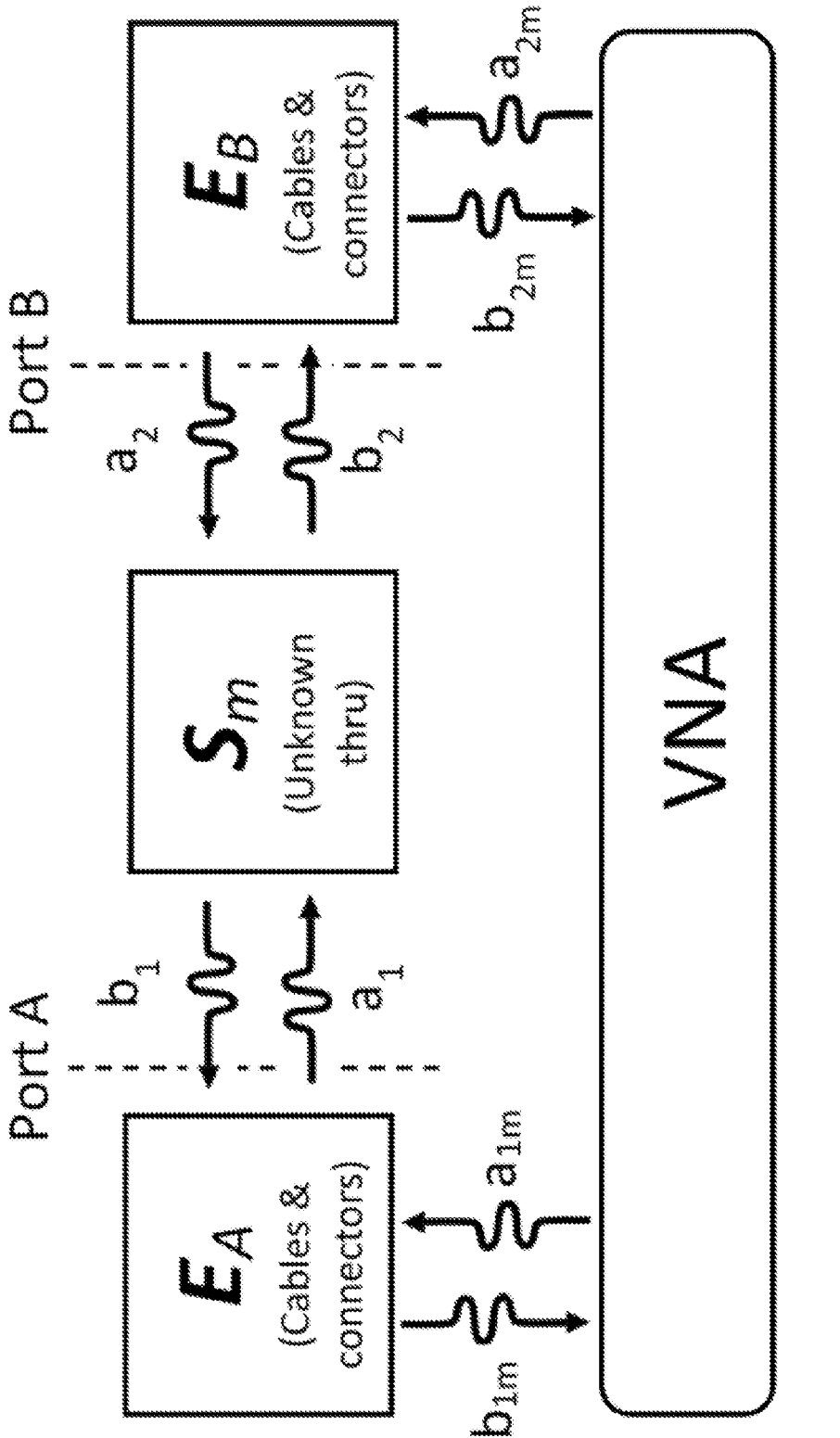
FIG. 5 is a schematic diagram illustrating the unknown object and error matrices of a prior art UT calibration method.

The UT method uses an eight-term error model, consisting of the measured unknown thru matrix, $S_m$, and two error matrices, $E_A$ and $E_B$ for respective ports A and B, as illustrated in FIG. 5. As described in Ferrero, in the context of a two-port network (which is easily extended to multiple ports by computing the error terms described below for all port pairs in the network), the two error boxes shown in FIG. 5 can be expressed as the scattering matrices:

$$E_A = \begin{bmatrix} e_A^{00} & e_A^{01} \\ e_A^{10} & e_A^{11} \end{bmatrix} E_B = \begin{bmatrix} e_B^{00} & e_B^{01} \\ e_B^{10} & e_B^{11} \end{bmatrix}$$

Matrices $Y_A$ and $Y_B$ are defined, relying solely on terms from these error matrices, and can be solved for each port individually using the reflection coefficient measured at the ports with three one-port standards (for the inline calibration modules described herein, these standards are provided by the short circuit, open circuit, and known load conditions):

$$Y_A = \begin{bmatrix} -\dfrac{\Delta_A}{t_{11}} & \dfrac{e_A^{00}}{t_{11}} \\ -\dfrac{e_A^{11}}{t_{11}} & \dfrac{1}{t_{11}} \end{bmatrix} Y_B = \begin{bmatrix} \dfrac{1}{t_{22}} & -\dfrac{e_B^{11}}{t_{22}} \\ \dfrac{e_B^{00}}{t_{22}} & -\dfrac{\Delta_B}{t_{22}} \end{bmatrix};$$

where $t_{11} = e_A^{01} e_A^{10}$, $t_{22} = e_B^{01} e_B^{10}$, $$\Delta_A = (e_A^{00} e_A^{11} - e_A^{01} e_A^{10}), \text{ and } \Delta_B = (e_B^{00} e_B^{11} - e_B^{01} e_B^{10}).$$

Transmission matrices $T_m$ and $T_{DUT}$ are computed from $S_m$ and $S_{DUT}$, where $S_{DUT}$ is the calibrated object (represented by "DUT") scattering matrix (this being the desired output from these calculations):

$$T_m = \begin{bmatrix} -\dfrac{\det S_m}{S_{m21}} & \dfrac{S_{m11}}{S_{m21}} \\ -\dfrac{S_{m22}}{S_{m21}} & \dfrac{1}{S_{m21}} \end{bmatrix} T_{DUT} = \begin{bmatrix} -\dfrac{\det S_{DUT}}{S_{DUT21}} & \dfrac{S_{DUT11}}{S_{DUT21}} \\ -\dfrac{S_{DUT22}}{S_{DUT21}} & \dfrac{1}{S_{DUT21}} \end{bmatrix}$$

9

Using the above terms, it can be verified that:

$$T_m = \alpha Y_A T_{DUT} Y_B^{-1},$$

$$\text{where } \alpha = \frac{e_A^{01}}{e_B^{01}}$$

$$\therefore T_{DUT} = \alpha^{-1} Y_A^{-1} T_m Y_B$$

Due to the assumption that $S_{DUT}$ is reciprocal, det $T_{DUT}$=1, giving:

$$\det T_m = \alpha^2 \det Y_A (\det Y_B)^{-1} => \alpha = \pm \sqrt{\frac{\det T_m \det Y_B}{\det Y_A}}$$

Now consider the result of all the known terms from the open circuit, short circuit, known load, and unknown thru measurements as X:

$$X = Y_A^{-1} T_m Y_B => S_{DUT21} = \frac{\alpha}{X_{22}}$$

The phase ambiguity for $\alpha$ can then be resolved using the approximate knowledge of the phase changes in $S_{ij}$. The phase knowledge needs to be within $$\pm \frac{\pi}{2}$$

for the resulting phase choice to be accurate. The remaining components, $S_{DUT11}$ and $S_{DUT22}$, are trivial to solve using the standard one-port calibration method known to those skilled in the art.

The Unknown Thru—Previous Thru Method

The primary difficulty with applying the UT method directly to an EM medical imaging system is that the patient can move within the array, and additionally physical processes inside the patient's body can cause subtle changes in its electromagnetic characteristics. The most significant effect of this is that the reciprocity assumption will not be met. As well as this, the unknown thru path when mounted on the body of a patient will likely suffer from high losses along some $S_{ij}$ signal paths. These uncertainties increase with decreasing measured signal to noise ratio, and consequently it is desirable to use a low loss path for the unknown thru.

For this reason, a calibration object of known dimensions is inserted into the imaging domain at a known location to collect the initial UT calibration parameters. The electromagnetic properties of the calibration object, which should be reciprocal (i.e., non-magnetic), can be optimised for best matching to the antennas. The calibration object needs to be positioned in a repeatable manner, providing consistent and known phase paths for each of the signal measurements. Furthermore, knowledge of the properties and size of the object can be used to provide a more accurate initial estimate of phase using the UT method.

For a fixed imaging system that is not altered in any way between the calibration object measurements and the patient measurements, this calibration object and the UT method would provide enough calibration. However, when using a portable system, it is impractical to mount the calibration object in the EM system with the exact same cable configuration used when measuring the patient. To address this difficulty, the inventors have developed a new calibration method referred to herein as the "Unknown Thru—Previous Thru" (or "UT-PT") calibration method, as follows:

1. Using the inline calibration modules described above, initial measurements are performed with a known calibration object in a known (and fixed) position within the imaging domain. The UT calibration terms described above are fully calculated for this position, and the resulting $S_{m,cal}$ is stored for later use.
2. The EM system is then moved to the patient, and the one-port calibration standards are measured, providing $Y_{A,pat}$ and $Y_{B,pat}$.
3. The thru error term for calibrating the patient data is then calculated according to:

$$\alpha_M = \pm \sqrt{\frac{\det T_{m,cal} \det Y_{B,pat}}{\det Y_{A,pat}}}$$

4. The phase ambiguity is resolved by using a calibration object whose average dielectric properties and location within the imaging domain are known. The patient data is then collected and calibrated using the modified alpha term:

$$T_{DUT,pat} = \alpha_M^{-1} Y_{A,pat}^{-1} T_{m,pat} Y_{B,pat}$$

Unknown Thru—Previous Thru Verification

To investigate how this substitution affects the alpha term, it can be seen that:

$$\det T_m = \frac{S_{m12}}{S_{m21}}, \det Y_A = \frac{1}{t_{11}}, \det Y_B = \frac{1}{t_{22}} => \alpha_M = \pm \sqrt{\frac{S_{m12,cal}}{S_{m21,cal} t_{11,pat} t_{22,pat}}}$$

where $t_{11}$ and $t_{22}$ are the reflection tracking error coefficients for each of the ports. These terms compensate for differences in the frequency response between the two receivers inside the VNA that collect and compare the source reference signal and the reflected signal for each port. The combination of these with the $S_{m21}$ and $S_{m12}$ measurements accounts for the transmission tracking error.

In practice, the reflection tracking error coefficients dominate the equation, having a larger effect than the ratio $S_{m12}/S_{m21}$. In the case that reciprocity is lost during the calibration as a result of the patient moving during the sweep time, this ratio term can become more dominant and introduce large inaccuracies in the calibration. The ratio term is solely reliant on the response port test and stimulus port reference signals in the case that reciprocity is maintained, therefore this term from the calibration object should be valid for use in the context of the patient measurements.

An example of this is shown in FIG. 6. In this example, the sweep time of the VNA was approximately 1.5 seconds. Compared are antenna pairs 1,3 and 1,15. Both antennas 1 and 3 were measured as the transmitter early in the measurement window, whereas antenna 15 was measured towards the end of the window. In the raw measurements of the calibration object (left graph), there was very little difference in reciprocity, as the calibration object was stable in the domain. In the raw patient measurement (right graph), it is clear that the reciprocity was affected to a small extent by the time the $3^{rd}$ antenna was transmitting, and then to a large extent when the $15^{th}$ antenna was transmitting.

Measurement Stability Monitoring

Another use of the inline calibration modules is the ability to monitor the amount of cable movement while the headset is in position for patient measurement. Periodically, the inline modules can be switched to a standard 50 Ohm terminal load, referred to in the art as a "matched load", a measurement taken and compared to the most recently match mode measurement while the array is positioned on the patient. If the power of the difference reaches levels higher than the signal to noise ratio required to generate accurate images, then it can be concluded that there has been movement of the cables, and that these effects will be larger than the response caused by disease. The system can then automatically repeat the measurement and comparison, wait until the movements subside, and only then proceed to collect calibration data and continue measurement of the patient.

Calibration Forms

As well as enabling the use of the UT-PT method, an EM imaging system can employ calibration objects with specific dielectric properties for solving numerous other calibration problems. Having known dielectric properties in a known position within a rigid array allows uncertainties in individual antennas and in the antenna array configuration to be addressed.

Many modifications will be apparent to those skilled in the art without departing from the scope of the present invention.

The invention claimed is:

1. A method of calibrating an electromagnetic medical imaging apparatus having a vector network analyser (VNA) coupled via transmission lines to an array of antennas disposed about an imaging domain, the method including the steps of:

using the apparatus to measure scattering parameters $S_{cal}$ for a known calibration object at a known location within the imaging domain, wherein each of the antennas of the array of antennas is connected to the VNA via a corresponding transmission line and a corresponding inline calibration module disposed between the transmission line and the antenna, wherein the measurements are performed for each of at least four configurations of the inline calibration module, the at least four configurations including a measurement configuration in which the inline calibration module is configured to electrically connect the transmission line to the corresponding antenna, and at least three calibration configurations in which the inline calibration module is configured to implement respective different calibration standards;

processing the measured scattering parameters $S_{cal}$ to calculate calibration terms $e^{00}$, $e^{01}$ $e^{10}$, and $e^{11}$ for ports A and B;

rearranging at least some of the transmission lines in preparation for imaging a subject disposed within the imaging domain;

with the rearranged transmission lines, measuring scattering parameters for one-port calibration standards to determine matrices $Y_A$ and $Y_B$ for respective ports A and B, according to:

$$Y_A = \begin{bmatrix} -\dfrac{\Delta_A}{t_{11}} & \dfrac{e_A^{00}}{t_{11}} \\ -\dfrac{e_A^{11}}{t_{11}} & \dfrac{1}{t_{11}} \end{bmatrix} Y_B = \begin{bmatrix} \dfrac{1}{t_{22}} & -\dfrac{e_B^{11}}{t_{22}} \\ \dfrac{e_B^{00}}{t_{22}} & -\dfrac{\Delta_B}{t_{22}} \end{bmatrix};$$

where $t_{11} = e_A^{01} e_A^{10}$, $t_{22} = e_B^{01} e_B^{10}$, $$\Delta_A = \left( e_A^{00} e_A^{11} - e_A^{01} e_A^{10} \right), \text{ and } \Delta_B = \left( e_B^{00} e_B^{11} - e_B^{01} e_B^{10} \right);$$

calculating a thru error term $\alpha_M$ for calibrating scattering parameters for the subject, according to:

$$\alpha_M = \pm \sqrt{\dfrac{\det T_{cal} \det Y_B}{\det Y_A}}$$

where $T_{cal}$ is the transmission matrix for the known calibration object;

with the rearranged transmission lines, measuring scattering parameters for the subject disposed within the imaging domain; and calibrating the measured scattering parameters of the subject according to:

$$T_{subject\_cal} = \alpha_M^{-1} Y_A^{-1} T_{subject} Y_B$$

where $T_{subject\_cal}$ and $T_{subject}$ are calibrated and uncalibrated transmission matrices for the subject, respectively.

2. The method of claim 1, wherein the at least three calibration configurations include calibration configurations in which the inline calibration module is configured to, respectively: (i) short circuit the transmission line, (ii) open circuit the transmission line, and (iii) electrically connect the transmission line to a predetermined load.

3. The method of claim 1, further including:

(i) using the apparatus to measure the scattering parameters while the subject remains disposed within the imaging domain, and the inline calibration modules are configured to connect the first end of the transmission line to the predetermined load;

(ii) computing a difference between a resulting measurement and a corresponding previous measurement; and (iii) comparing the difference to a noise level to assess movement of the transmission lines.

4. The method of claim 3, further including repeating steps (i) to (iii) at temporally spaced intervals to monitor for movement of the transmission lines over time.

5. The method of claim 4, including pausing further measurements of scattering parameters unless the computed difference is substantially larger than the noise level.

6. An electromagnetic medical imaging apparatus configured to implement the method of claim 1.

7. A computer-readable storage medium having stored thereon executable instructions that, when executed by at least one processor of an electromagnetic medical imaging apparatus, cause the at least one processor to:

use the apparatus to measure scattering parameters $S_{cal}$ for a known calibration object at a known location within an imaging domain, wherein each antenna of an array of antennas is connected to a vector network analyser (VNA) via a corresponding transmission line and a corresponding inline calibration module disposed between the transmission line and the antenna, wherein the measurements are performed for each of at least four configurations of the inline calibration module, the at least four configurations including a measurement configuration in which the inline calibration module is configured to electrically connect the transmission line to the corresponding antenna, and at least three calibration configurations in which the inline calibration module is configured to implement respective different calibration standards;

process the measured scattering parameters $S_{cal}$ to calculate calibration terms $e^{00}$, $e^{01}$, $e^{10}$ and $e^{11}$ for a port A and a port B;

rearrange at least some of the transmission lines in preparation for imaging a subject disposed within the imaging domain;

with the rearranged transmission lines, measure scattering parameters for one-port calibration standards to determine matrices $Y_A$ and $Y_B$ for respective ports A and B, according to:

$$Y_A = \begin{bmatrix} -\dfrac{\Delta_A}{t_{11}} & \dfrac{e_A^{00}}{t_{11}} \\ -\dfrac{e_A^{11}}{t_{11}} & \dfrac{1}{t_{11}} \end{bmatrix} Y_B = \begin{bmatrix} \dfrac{1}{t_{22}} & -\dfrac{e_B^{11}}{t_{22}} \\ \dfrac{e_B^{00}}{t_{22}} & -\dfrac{\Delta_B}{t_{22}} \end{bmatrix};$$

where $t_{11} = e_A^{01} e_A^{10}$, $t_{22} = e_B^{01} e_B^{10}$, $\Delta_A = \left( e_A^{00} e_A^{11} - e_A^{01} e_A^{10} \right)$, and $\Delta_B = \left( e_B^{00} e_B^{11} - e_B^{01} e_B^{10} \right)$;

calculate a thru error term $\alpha_M$ for calibrating scattering parameters for the subject, according to:

$$\alpha_M = \pm \sqrt{\frac{\det T_{cal} \det Y_B}{\det Y_A}}$$

where $T_{cal}$ is the transmission matrix for the known calibration object;

with the rearranged transmission lines, measure scattering parameters for the subject disposed within the imaging domain; and calibrate the measured scattering parameters of the subject according to:

$$T_{subject\_cal} = \alpha_M^{-1} Y_A^{-1} T_{subject} Y_B$$

where $T_{subject\_cal}$ and $T_{subject}$ are calibrated and uncalibrated transmission matrices for the subject, respectively.

8. An electromagnetic medical imaging apparatus including:

an array of antennas disposed about an imaging domain;

a vector network analyser (VNA) connected to the antennas via respective transmission lines and inline calibration modules disposed between the antennas and the transmission lines;

at least one processor configured to perform the steps of:

receiving from the VNA, measurements of scattering parameters $S_{cal}$ for a known calibration object at a known location within the imaging domain, wherein the measurements are performed with the transmission lines in a first arrangement and for each of at least four configurations of the inline calibration modules, the at least four configurations including a measurement configuration in which the inline calibration module is configured to electrically connect the transmission line to the corresponding antenna, and at least three calibration configurations in which the inline calibration module is configured to implement respective different calibration standards;

processing the measured scattering parameters $S_{cal}$ to calculate calibration terms $e^{00}$, $e^{01}$, $e^{10}$, and $e^{11}$ for ports A and B;

receiving from the VNA measurements of scattering parameters for one-port calibration standards, wherein the measurements are performed with at least some of the transmission lines in a second arrangement different to the first arrangement in preparation for imaging a subject disposed within the imaging domain;

processing the scattering parameters for the one-port calibration standards to determine matrices $Y_A$ and $Y_B$ for respective ports A and B, according to:

$$Y_A = \begin{bmatrix} -\dfrac{\Delta_A}{t_{11}} & \dfrac{e_A^{00}}{t_{11}} \\ -\dfrac{e_A^{11}}{t_{11}} & \dfrac{1}{t_{11}} \end{bmatrix} Y_B = \begin{bmatrix} \dfrac{1}{t_{22}} & -\dfrac{e_B^{11}}{t_{22}} \\ \dfrac{e_B^{00}}{t_{22}} & -\dfrac{\Delta_B}{t_{22}} \end{bmatrix};$$

where $t_{11} = e_A^{01} e_A^{10}$, $t_{22} = e_B^{01} e_B^{10}$, $\Delta_A = \left( e_A^{00} e_A^{11} - e_A^{01} e_A^{10} \right)$, and $\Delta_B = \left( e_B^{00} e_B^{11} - e_B^{01} e_B^{10} \right)$;

calculating a thru error term $\alpha_M$ for calibrating scattering parameters for the subject, according to:

$$\alpha_M = \pm \sqrt{\frac{\det T_{cal} \det Y_B}{\det Y_A}}$$

where $T_{cal}$ is the transmission matrix for the known calibration object;

with the rearranged transmission lines, measuring scattering parameters for the subject disposed within the imaging domain; and calibrating the measured scattering parameters of the subject according to:

$$T_{subject\_cal} = \alpha_M^{-1} Y_A^{-1} T_{subject} Y_B$$

where $T_{subject\_cal}$ and $T_{subject}$ are calibrated and uncalibrated transmission matrices for the subject, respectively.

9. The apparatus of claim 8, wherein the at least three calibration configurations include calibration configurations in which the inline calibration module is configured to, respectively: (i) short circuit the transmission line, (ii) open circuit the transmission line, and (iii) connect the transmission line to a predetermined load.

10. The apparatus of claim 8, wherein the at least one processor is further configured to perform the steps of:

(i) using the apparatus to measure the scattering parameters while the subject remains disposed within the imaging domain, and the inline calibration modules are configured to connect the transmission line to the predetermined load;

(ii) computing a difference between a resulting measurement and a corresponding previous measurement; and (iii) comparing the difference to a noise level to assess movement of the transmission lines.

11. The apparatus of claim 10, wherein the at least one processor is further configured to repeat steps (i) to (iii) at temporally spaced intervals to monitor for movement of the transmission lines over time.

12. The apparatus of claim 11, wherein the at least one processor is further configured to pause further measurements of scattering parameters unless the computed difference is substantially larger than the noise level.

* * * * *